April 25, 1967 J. J. GRADY 3,316,079
STEEL SLAG HANDLING SYSTEM
Original Filed Aug. 27, 1963 2 Sheets-Sheet 2
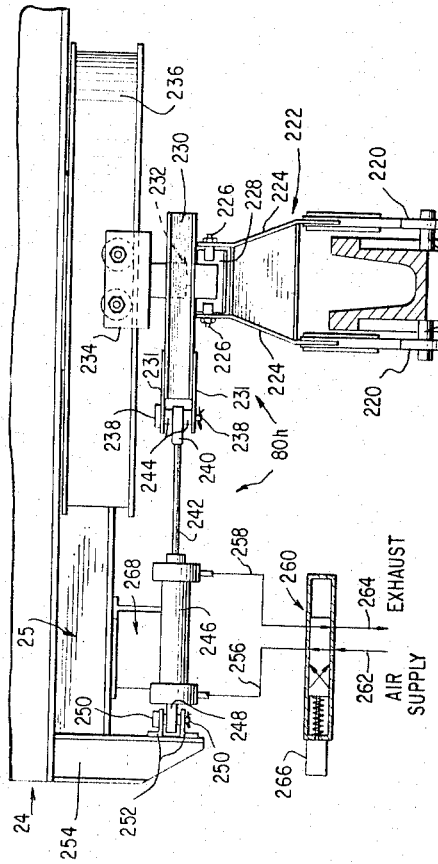
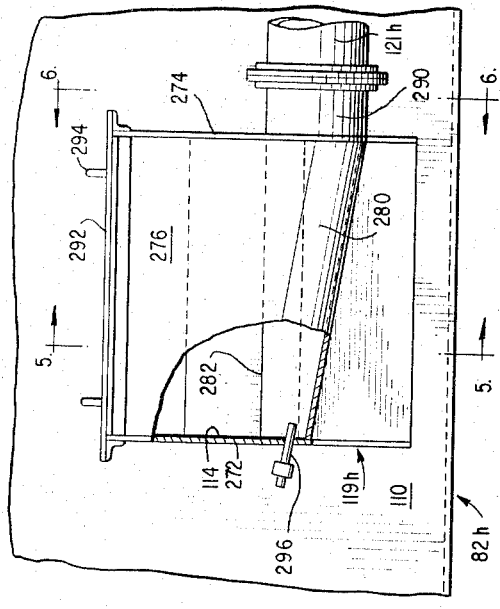
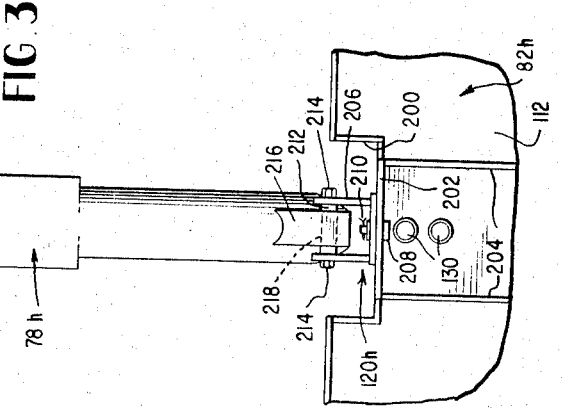
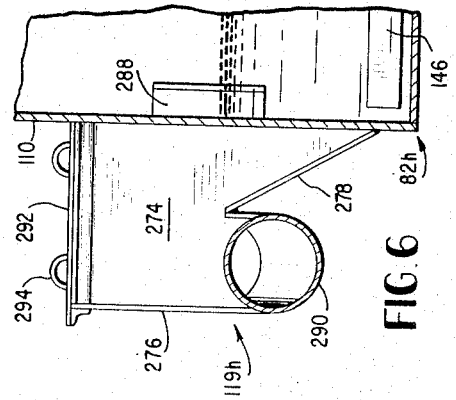
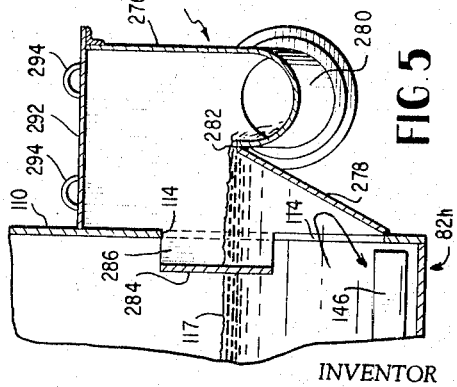
INVENTOR
JOHN J. GRADY
BY *LeBlanc and Shur*
ATTORNEYS

United States Patent Office 3,316,079
Patented Apr. 25, 1967

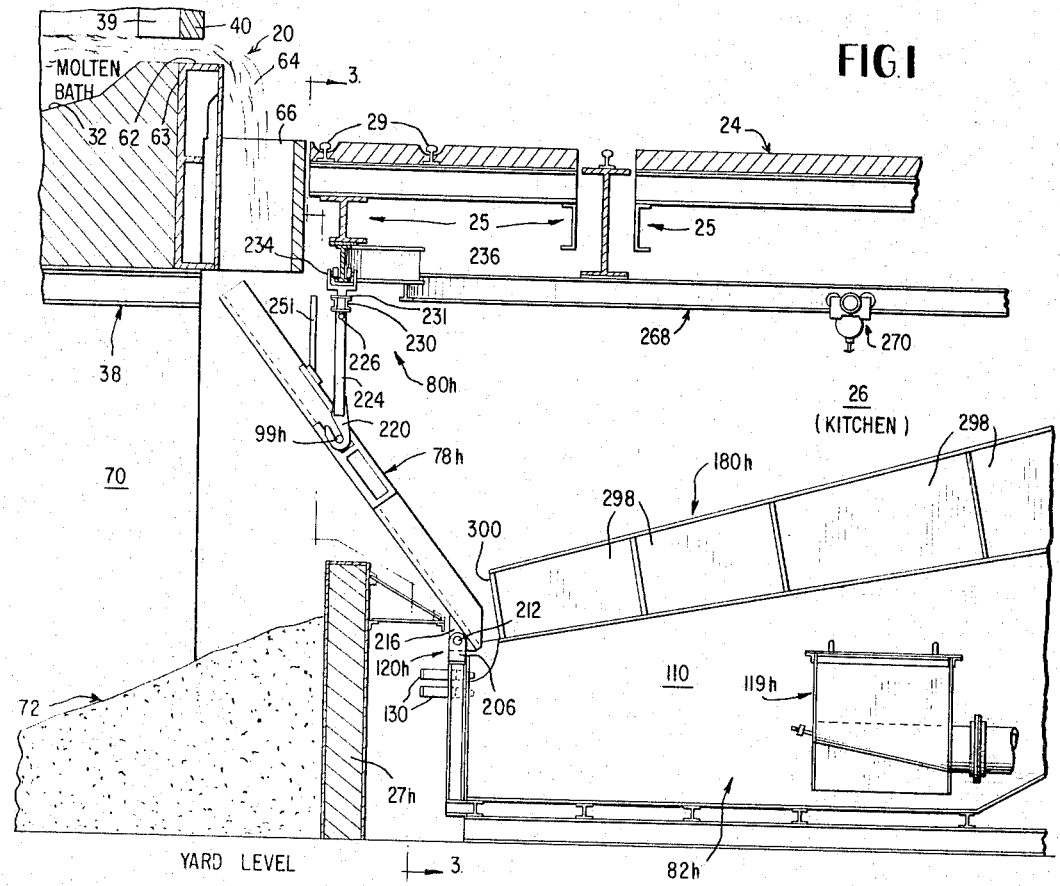

3,316,079
STEEL SLAG HANDLING SYSTEM
John J. Grady, Michigan City, Ind., assignor to International Steel Slag Corporation, Washington, D.C., a corporation of the District of Columbia
Continuation of application Ser. No. 304,932, Aug. 27, 1963. This application May 18, 1966, Ser. No. 551,168
19 Claims. (Cl. 65—141)

This application is a continuation of Ser. No. 304,932, filed Aug. 27, 1963, which in turn is a continuation-in-part of my application, Ser. No. 126,792, filed June 28, 1961, now abandoned, entitled, "Steel Slag Handling System," and the disclosure of that parent application, Ser. No. 126,792, is herein incorporated by reference as though here fully set forth.

The present invention relates to a system for more efficient, faster and more economical handling of slag discharged from steel-making furnaces and recovery of ferrous material therefrom. More especially, the present invention relates to new, improved apparatus for discharging red hot slag from an open hearth furnace into a granulator which converts the slag to a granular mixture of ferrous and slag particles of relatively small size and low temperature which can be rapidly conveyed from the furnace building during the steel making operation and can thereafter be separated magnetically to reclaim usable ferrous material.

As discussed in my aforementioned parent application, Ser. No. 126,792, the efficient quick removal of large quantities of slag from open-hearth furnaces and out of the furnace building is a long-standing major problem in the manufacture of steel. Moreover, this problem has been greatly accentuated since World War II by the development of modern techniques which make it possible to produce substantially greater quantities of steel per heat in much shorter time with existing open hearth furnaces, thereby increasing the amount of slag which must be removed from the furnace building while decreasing the time available to remove it. The need for an efficient system of removing increasingly large quantities of slag in less time at reasonable cost has thus been a matter of serious concern to the steel industry.

For many years, it has been common practice in leading steel mills to discharge open hearth steel furnace slag into cast iron slag pots removable from the furnace building by rail cars, as amplified in my parent application, Ser. No. 126,792. However, this slag pot system has proved inadequate and unsatisfactory for removal of large tonnages of slag, particularly as open hearth furnace capacity increased and melt time decreased. Thus, some leading steel plants have adopted a system of discharging the open hearth "front flush slag" and "ladle slag" to the pit of the open hearth shop, and thereafter removing it from the furnace building by means of high lift tractors and heavy duty trucks, as amplified in my parent application, Ser. No. 126,792. This current system, however, also has a number of serious inherent limitations noted in my aforementioned parent application. Hence, removal of slag has become a "bottle neck" that prevents the maximum utilization of existing steel furnaces and the realization of tremendous economic savings and other advantages which would thus be achieved.

My parent application Ser. No. 126,792 is directed to an invention which provides a new improved slag removal system that departs from the slag materials handling concepts of current and earlier systems such as discussed above, thereby avoiding their serious shortcomings and making it possible to achieve continuous and immediate removal of slag from the open hearth furnace building. More particularly, my parent application Ser. No. 126,792 discloses inventions providing a new, improved slag handling method and apparatus whereby the red-hot molten slag from the steel furnace is discharged to a "granulator" wherein it is suddenly cooled and granulated by jets of water or like medium to form relatively small discrete particles of granular slag material which is then discharged from the granulator and transported by continuous conveyor means from the open hearth building. This new invention achieves complete granulation and removal of slag produced in a large heat, like 350 tons, almost immediately after the molten slag is discharged from the furnace. Hence, the new improved slag handling system of my parent application eliminates the slag removal bottle neck which has prevented optimum use of improved oxygen techniques and shorter heat times with larger capacity furnaces. This new system also achieves other important objects and advantages as discussed in my parent application, Ser. No. 126,792, including quick, efficient, economical magnetic separation of reusable ferrous material from non-ferrous slag, with low cost materials handling for each of them.

One of the particular objects of the invention of my parent application, Ser. No. 126,792, is to provide such an improved steel slag granulation and handling system incorporating a novel movable slag runner arrangement for transferring molten slag from the furnace to the slag granulator whereby the slag runner is removable from the "front flush" slag spillway of an open hearth furnace to divert the front flush slag from the granulator to the pit below the open hearth furnace, for removal in conventional manner in the event that should be necessary or desirable.

It is a primary object of the present invention to provide a new improved system for granulating hot molten steel slag in the furnace building, and particularly to provide such a system incorporating a new improved slag runner arrangement for transferring open hearth steel furnace front flush slag to a slag granulator in the "kitchen" whereby the slag runner is normally disposed out of the front flush slag spillway, and can be readily disposed in front of the front flush spillway when the slag granulator is operating, but is immediately removable from the front flush spillway to divert front flush slag from the granulator to the pit below the open hearth furnace. It is a related object to provide such a new improved movable slag runner arrangement for open hearth steel furnace front flush slag which includes a chute having its lower end pivotally associated with the slag granulator located in the kitchen and an upper portion movably supported on a curved track, whereby the slag runner can be disposed in or out of the front flush slag stream to feed slag to the granulator or divert it to the pit floor, as desired.

It is another related object to provide such a movable slag runner arrangement having simplified trouble-free operating means comprising a reciprocating air cylinder and piston with a curved monorail track and trolley arrangement, for disposing the slag runner in desired position to feed slag to the granulator or discharge it to the pit floor. It is still another related object to provide such an arrangement in which the air cylinder and piston control is designed to normally dispose the slag runner outside the path of the molten front flush slag and requires positive actuation by the operator to dispose the runner in the front flush slag spillway in order to feed molten slag to the granulator.

It is yet another object of this invention to provide means whereby the improved pivotable slag runner may readily be removed for replacement or maintenance.

It is a further object of this invention to provide the slag granulator with a new improved tank overflow drain which minimizes discharge from the granulator of solid granulated slag materials in the waste water, and thus facilitates compliance with state laws limiting solid contents discharged to sewage facilities, rivers or the like. It is another related object to provide a new improved tank overflow drain which deflects granulated slag solids back into the path of the rake conveyor within the granulator tank and thereby increases efficiency of the rake conveyor and the granulator as a whole.

It is still another object of this invention to provide an improved hood arrangement for the slag granulator.

Other important objects and advantages of the present invention will be apparent from the following description thereof with reference to the accompanying drawings, and from the claims appended hereto. In the drawings:

FIGURE 1 is a diagrammatic cross section view of part of an open-hearth furnace (similar to FIGURES 5 and 12 of my parent application S.N. 126,792) showing in side elevation a new improved open hearth slag handling system according to the present invention, including a slag granulator in the "kitchen" with a movable slag runner disposed below the front flush slag spillway for conveying slag to the granulator, with means for moving the slag runner to displace it from below the front flush spillway in order to divert slag to the slag grade hill below the furnace.

FIGURE 2 is a top plan view of the slag handling system and movable chute arrangement shown in FIGURE 1 (with the open hearth charging floor being omitted for clearer illustration).

FIGURE 3 is an elevation and partly sectional view of the movable slag runner arrangement of this invention shown in FIGURES 1 and 2, looking along line 3—3 in FIGURE 1.

FIGURE 4 is a side elevation view of the new improved granulator tank overflow drain arrangement according to the present invention, with part broken away for clearer illustration.

FIGURE 5 is a sectional view of the new improved granulator tank overflow drain arrangement shown in FIGURE 4, looking along line 5—5 in FIGURE 4.

FIGURE 6 is an elevation and partly sectional view of the new improved granulator tank overflow drain arrangement shown in FIGURE 4, looking along line 6—6 in FIGURE 4.

Referring to FIGURES 1–6 there is shown a new improved apparatus for granulating and handling open hearth front flush steel slag which is substantially like that disclosed in FIGURES 4–13 of my parent application S.N. 126,792 excepting for (1) improvements in the movable front flush slag runner arrangement for the slag granulator, and (2) modification of the granulator tank overflow drain and hood, as amplified below. Accordingly, to facilitate and abbreviate the description herein, parts of the new improved system shown in FIGURES 1–6 which are the same as in the embodiment of FIGURES 4–13 of my parent application Ser. No. 126,792 are identified by like numerals as in said figures of my parent application. Further, modified parts are identified to the extent feasible with like numerals as corresponding parts of the arrangement of FIGURES 4–13 of my parent application Ser. No. 126,792 plus the subscript h.

Referring to FIGURES 1–6, there is shown part of a two level open hearth steel furnace shop which contains a charging floor 24 above the general yard level of the building with an area 26 called the "kitchen" below the charging floor. The charging floor 24 is supported by conventional building structure indicated generally at 25, and is laid with various tracks indicated generally at 29 for operation of rail cars and charging machines for the open hearth furnaces, a part of one furnace being generally indicated at 20 with the supporting steel framework being generally indicated at 38. (The open hearth furnace 20 and its supporting framework 38 is shown and described in greater detail in my parent application S.N. 126,792, but is not itself a part of the present invention so that further description thereof is believed unnecessary.)

Referring especially to FIGURE 1, the front wall of the open hearth furnace 20 contains a plurality of charging openings 39 each covered by a vertically movable charging door 40. A bath of molten steel and slag is contained in a pan-type furnace bottom 32, and the doorway 39 shown in FIGURE 1 is provided with an opening 62 through which front flush slag 64 is discharged from the open hearth furnace 20 over a front flush sill 63 and through a castiron spillway 66 set in the charging floor 24. Ordinarily, the front flush slag is discharged through the spillway 66 to a sloping slag grade 72, whereby the molten slag flows down hill 72 below furnace 20 between the spaced vertical furnace walls 70 to the pit side of the furnace building (as shown and amplified in my parent application S.N. 126,792). A barricade wall 27 is provided at the kitchen end of slag grade 72, as illustrated.

Referring particularly to FIGURES 1–3, the slag-handling system of the present invention generally comprises a new, improved movable slag runner 78h for transferring front flush slag discharged through spillway 66 to an associated granulator 82h in kitchen 26, with means generally indicated at 80h for moving the slag runner 78h to and from below the slag spillway 66. The granulator 82h is substantially the same as the granulator 82 shown and described in my parent application S.N. 126,792, and includes granulation nozzles 130 with a rake conveyor and drive motor (shown at 132 and 150, etc. in parent case 126,792, but omitted from FIGURES 1–3 of this case for clarity). The significant differences in granulator 82h compared to granulator 82 of my parent case, Ser. No. 126,792, are (1) Provision of an improved granulator tank overflow drain box generally indicated at 119h on the granulator tank side 110 (instead of discharge box 119 and related parts shown particularly in FIGURES 6 and 7 of parent application Ser. No. 126,792);

(2) Provision of a different granulator tank hood arrangement indicated at 180h (instead of hood 180 particularly shown in FIGURES 5 and 6 of parent case S.N. 126,792);

(3) Provision of a modified mounting arrangement generally indicated at 120h for the lower end of the slag runner 78h at granulator rear end wall 112; and (4) Elimination of the steam removal manifold arrangement generally shown at 164 in parent application S.N. 126,792, particularly FIGURES 5–7 thereof.

Accordingly, this application hereinafter describes in detail only the above-mentioned portions of granulator 82h which are generally indicated at 119h, 180h and 120h, since the description of the granulator 82 in parent application Ser. No. 126,792 is otherwise applicable.

Reference is now made particularly to the new improved movable slag runner arrangement 78h, its operating means 80h, and its lower pivotal mount arrangement 120h, shown in FIGURES 1–3.

The slag runner 78h is trough-shaped (as shown especially in FIGURE 3) and is made of cast steel or the like; it also is preferably lined on the inside with a refractory material (not shown), in a manner known in the art. The rear wall 112 of the granulator 82h is provided with a cut-out 200 to accommodate the front lower end of the slag runner 78h; and there are secured to back wall 112 (by welding, bolts or the like) a horizontal mounting plate 202 and supporting vertical members 204. A generally U-shaped bracket 206 is pivotally mounted on horizontal plate 202 by means of a vertical pivot pin 208 secured by cotter pin 210 or like suitable means. A second horizontal pivot pin 212 is mounted in apertures in the vertically disposed opposite sides of U-bracket 206 and is secured by suitable means such as lock nuts 214 on threaded ends of pivot pin 212. The lower end of the slag runner 78h is provided with a lug 216 having an aperture 218 which receives the horizontal pin 212 so as to pivotally mount the lower end of slag runner 78h on the back wall 112 of granulator 82h.

The opposite sides of the trough-shaped slag runner 78h are provided with a pair of aligned hook lugs 99h, whereby the upper portion of slag runner 78h is supported at an angle, as shown in FIGURE 1, by engagement of lugs 99h in hooks 220. Hooks 220 are part of the trough displacing means generally indicated at 80h and are mounted on a supporting frame 222 constructed as shown, with a pair of side members 224 whose upper ends are pivotally mounted on pins 226 secured in and extending from a block member 228. Block member 228 is in turn supported on a box-like member 230 made up of two channels connected by horizontally disposed straps 231 welded or otherwise suitably secured thereto. The box-like member 230 accommodates a conventional design trolley clevice swivel 232, and this arrangement is in turn supported on a conventional trolley 234 which rides on a curved trolley monorail 236, as shown in FIGURES 1–3. The curved trolley monorail 236 is secured to existing furnace steel work 25 by any suitable means such as welding, bolts or the like. (A suitable monorail trolley arrangement for use as disclosed herein may be obtained from existing commercial sources, such as the American Monorail Co.)

Referring particularly to FIGURE 3, the straps 231 extend laterally from the ends of box-channels member 230 and are provided with aligned apertures in which a pivot pin 238 is mounted in any suitable manner so as to extend through the eye end 240 of air cylinder piston rod 242, with spacer collars 244, as shown. Piston rod 242 extends from a conventional double acting air cylinder 246 whose other end is provided with an apertured lug 248 pivotally mounted on a pin 250 secured in a pair of apertured angles 252 which are welded or otherwise secured to an anchor member 254 that is, in turn, welded or otherwise suitably secured to existing furnace building structure 25.

The double acting cylinder 246 is provided with a pair of air supply and exhaust lines 256 which are connected to the outlet side of a suitable commercially available four-way valve 260 whose input side is connected to a suitable air supply line 262, with air exhaust indicated at 264. As diagrammatically illustrated, the valve 260 is biased so that compressed air is normally fed through the conduit 258 to the piston rod side of cylinder 246 whereby the piston rod 242 is normally retracted in the cylinder so that the slag runner 78h is normally disposed in the dotted line position in FIGURE 2 out of the path of the molten front flush slag discharged through the spillway 66. Thus, slag front flushed through furnace door opening 39 and spillway 66 is discharged to the slag grade 72 and flows beneath the furnace 20 to the pit side. (A suitable stop, not shown, may be provided on the trolley monorail 236 to limit the nonoperating position of slag runner 78h as desired.)

Valve 260 is operated, by suitable means such as a solenoid schematically shown at 266, to cause compressed air to be supplied through conduit 256 to displace the piston 242 (to the right in FIGURE 3) thereby moving the slag runner 78h into alignment with and below the front flush slag spillway 66 (as shown in solid line in FIGURE 2). When in this position, slag runner 78h transfers molten front flush slag 64 to the granulator 82h where it is granulated by water jets from nozzle 130 and conveyed along the length of, and discharged from, the granulator 82h by the rake conveyor in the granulator, as described in detail in my parent application Ser. No. 126,792, herein incorporated by reference. (See particularly disclosure on granulator 82 and rake conveyor 132 and related means in my parent application.)

The valve 260 controlling the hydraulic cylinder and piston 242, 246 for positioning slag runner 78h is governed by a so-called "dead man switch" (or an alternative "dead man" hydraulic, mechanical or electrical control of known type) so that the operator must positively actuate valve 260 to dispose slag runner 78h below spillway 66 for transfer of molten slag to the granulator 82h. This provides a safeguard against undesired transfer of molten slag to granulator 82h, as for example, if the operator should leave the granulator, or in the event of nonoperation of the conveyor rake and/or rake driver motor (see 132 and 150 of granulator 82 in my patent application). Further, it is contemplated that control valve 260, which governs disposition of slag runner 78h for transfer or nontransfer of molten slag to granulator 82h, will be suitably interlocked with (1) the control or electric supply for the motor driving the rake conveyor in granulator 82h (see components 132, 150 and related parts of granulator 82 in my parent application Ser. No. 126,792); and (2) the pump or valve means controlling supply of water to the jet nozzles 130 of granulator 82h. These control interlocks are such that slag runner 78h is not movable to a position below the front flush slag spillway 66 (solid line position in FIGURE 2), whereby slag cannot be fed to granulator 82h, unless the granulator 82h is being provided with adequate supply of water at a suitable pressure and the granulator rake conveyor is operating to displace slag from the input end of the granulator 82h and discharge it from the granulator. The control valve 260 for hydraulic cylinder 246 positioning slag runner 78h may also be interlocked to other control so as to be responsive to additional pertinent operating factors; e.g., it may be interlocked to prevent feeding molten slag to granulator 82h in the event of excessive temperature of water discharged from the granulator tank (which, however, is not generally a problem with the new improved system of this invention).

The slag runner 78h is preferably provided with a baffle plate 251 suitably secured to the upper side of the trough-shaped runner as shown particularly in FIGURES 1 and 2. This prevents undesirable splash or surge of molten slag towards other parts of the slag runner positioning means 80h when slag runner 78h is disposed below the spillway 66 for transferring slag to the granulator 82h.

It is also noted that the front flush slag spillway 66 as illustrated is somewhat wider than the slag runner 78h. The size of the main stream of the front flush slag 64 is determined primarily by the size of the slag notch 62 cut in the bottom of door opening 39; and the relative dimension of slag runner 78h to slag spillway 66 as shown is satisfactory. However, these relative dimensions may be adjusted in light of operating conditions in a manner apparent to those skilled in the art in light of the disclosure herein. Also, the configuration of front flush slag spillway 66 could be suitably modified, as by coning down the spillway so that the opening at charging floor 24 is relatively large and the lower end overlying part of slag runner 78h is smaller, with a width approximately that of runner 78h. Also, the slag runner 78h could be made with an enlarged head section (like slag runner 78 shown in FIGURE 13 of my parent application Ser. No. 126,-792).

The system of the present invention also preferably includes another transfer monorail 268 secured by welding or the like to existing furnace building structure 25, and extending lengthwise alongside the granulator 82h, with its end near furnace 20 being curved towards one end of the arcuate monorail 236 supporting slag runner 78h, as shown in FIGURES 1–3. There is mounted on transfer monorail 268 a hoist with a geared trolley indicated generally at 270. This arrangement provides a means for readily removing the slag runner 78h (after disconnecting the lower pivot pin 212 and nuts 214) for replacement or maintenance. Trolley hoist 270 on transfer monorail 268 may also be used for moving other heavy parts within the low head room space in the kitchen 26 where granulator 82h is located. (A suitable hoist and gear trolley is the Cyclone Model "M" No. 4610, Chisholm-Moore Hoist Division of Columbus-McKinnon Chain Corp., or equal.) Transfer monorail 268 is also preferably provided with stops at its ends in conventional manner.

Referring now particularly to FIGURES 1 and 4–6, the new improved granulator tank overflow drain unit generally indicated at 119h will now be more particularly described.

Side 110 of the tank of granulator 82h is provided with a cut-out 114 surrounded by a portion of the overflow drain unit 119h which includes a pair of end walls 272 and 274, a side wall 276, a slanted bottom wall portion 278 and a curved bottom wall portion 280, each having a configuration as shown in FIGURES 4–6 and being welded together at adjacent edges. This sub-unit 119h is secured to the side wall 110 of granulator 82h by welding the edges of sides 272 and 274 and bottom wall section 278 to side wall 110. The junction 282 between the flat slanted bottom portion 278 and the curved bottom portion 280 is substantially horizontal and forms an overflow weir edge which determines the level of water 117 within the tank of granulator 82h. A baffle plate 284, supported by two plates 286 and 288 secured to the inside of granulator tank wall 110, extends horizontally across the opening 114 and vertically over the upper part of opening 114, as will be apparent from the drawings.

The arcuate bottom portion 280 of overflow drain unit 119h slopes downward towards the forward end of the granulator 82h to a circular aperture in the end wall 274, and a short section of pipe 290 is welded to end wall 274, as shown in FIGURES 4–6. A discharge pipe 121h is connected to pipe section 290 and serves to carry away water from granulator 82h to a suitable disposal point; as pointed out in my parent application Ser. No. 126,792, a discharge or circulating pump can be provided in this discharge line, if desired.

A water spray nozzle 296 is mounted in end wall 272 of overflow drain unit 119h and is disposed at a like angle to horizontal as the axis of the curved bottom section 280. Water is supplied to nozzle 296 by any suitable means (not shown), and the spray from nozzle 296 is utilized to flush solids from section 280 of overflow drain unit 119h to the discharge conduit 121h. If desired, the overflow drain unit 119h, may be provided with a removable cover 292 having handles 294, thereby preventing ingress of foreign objects, while permitting ready access to the inside of overflow drain unit 119h for cleaning or the like.

The hood 180h of granulator 82h is made up of a number of steel plate sections 298 bolted to each other and to the top of the tank of granulator 82h as will be apparent from FIGURES 1 and 2. The steel hood 180h extends from adjacent the rear end of the granulator 82h as shown in FIGURES 1 and 2 to near the "prow" end of granulator 82h, with the forward end of hood 180h being disposed in about the same relationship to the prow end of granulator 82h as the forward end of hood 180 with respect to the prow end of granulator 82, per FIGURES 6 and 7 of my parent application S.N. 126,792. The height of steel hood 180h is sufficient to accommodate the upper components of the rake conveyor within the granulator (not shown). (That is, the hood 180h accommodates the upper chain section and flights, rollers, shafts, bearing blocks, etc. like components 138 and 144–149 etc. of the rake conveyor 132 particularly shown in FIGURES 6 and 7 of my parent application S.N. 126,792.) The rear end of hood 180h, incidated by numeral 300, is preferably left open to permit ingress of a man for checking or maintenance of granulator 82h, and particularly the rake conveyor within the granulator. However, if desired, the rear end of hood 180h, may be partially closed off, leaving sufficient room for pivoting the lower end of slag runner 78h to dispose it below, or away from, the front flush spillway 66, as illustrated in FIGURE 2.

While it is believed that the operation of the new improved steel slag handling system and apparatus of the present invention will be apparent from the foregoing description thereof with reference to FIGURES 1–6 (in light of the disclosure in my parent application S.N. 126,792, incorporated herein by reference), the mode of operation of the system herein disclosed will be briefly summarized:

During the steel making operation of the open hearth furnace 20, about 65% of the slag is front flushed through the doorway 39 below door 40 into the spillway 66. Unless control valve 260 is operated to supply compressed air to air cylinder 246 via line 256 (see FIGURE 3), the slag runner 78h will be in the dotted line position in FIGURE 2 so that the molten front flush slag 64 will be discharged through spillway 66 to the slag grade 72 and will flow down it to the pit side of the furnace. When the operator actuates the control for valve 260, compressed air is supplied to air cylinder 246 through line 256 causing extension of the piston 242 to dispose the slag runner 78h with its upper end below the front flush slag spillway 66, as shown particularly in FIGURES 1, 2 and 3. The molten slag thereupon falls from the spillway 66 into the head end of the slag runner 78h and then spills into the rear end of the granulator 82h where it intercepts two horizontally extending jets of water under pressure emitted from the upper and lower nozzles 130. These jets of water rapidly chill the hot slag and cause it to be converted into a relatively finely divided granulated solid product which consists of discrete particles of solid metal and solid slag. The granulated particles of slag and metal fall into the layer of water 117 in the bottom of the tank of granulator 82h, where they are further cooled. Steam formed during the granulation of the molten slag is emitted from openings in hood 180h, most of it passing off from the opening at the prow end of the hood 180h; a conventional fan may be supplied, adjacent the prow end of granulator 82h to disperse the steam if it is generated in sufficient quantities to require that.

The resultant granulated particles of metal and slag fall into the bottom of the tank and are transferred to the forward "prow" end of the granulator 82h, and discharged from the granulator, by means of a rake conveyor such as the conveyor generally indicated at 132 in granulator 82 disclosed in my parent application S.N. 126,792 (particularly FIGURES 6–7 thereof). Referring to FIGURES 5 and 6, a fragment of one of the lower flights 146 of the rake conveyor (132 in my parent application S.N. 126,792) is shown adjacent the opening 114 in granulator side wall 110, which is surrounded by overflow drain unit 119h. The weir edge 282 of overflow drain unit 119h governs the level of the water 117 within the granulator 82h; for a granulator 82h constructed of like dimensions and operated in like manner and conditions as granulator 82 in my parent application S.N. 126,792, the water level 117 within the tank of granulator 82h will be about 3 inches above the weir edge 282. The baffle plate 284 prevents solid particles of the granulated slag floating in water 117 within the granulator tank from passing to the overflow drain unit 119h and thence to the discharge conduit 121h. This substantially minimizes the solid content discharged from granulator 82h and aids in complying with state and local laws limiting the amount of solids disposed from industrial plants into sewage systems, rivers, and the like, obviating or minimizing the need for additional equipment to accomplish that.

There is some agitation of the water 117 within granulator 82h, as, for example, due to operation of flights 146 of the rake conveyor (shown at 132 in my parent application S.N. 126,792). The lower slanted wall portion 278 of the overflow drain unit 119h acts as a counter-current deflector as diagrammatically illustrated by the curved arrow in FIGURE 5, whereby granulated slag material passing through the cut-out 114 in side wall 110 below baffle plate 284 is deflected back towards the flights 146 of the rake conveyor in granulator 82h. This incerases the efficiency of removal of granulated slag and metal particles from granulator 82h and also minimizes the granulated solids passing to discharge conduit 121*h*. If, however, there should be any accumulation of granulated slag in the arcuate section 280 of overflow drain unit 119*h*, water spray may be applied from nozzle 296 to flush such particles into the discharge conduit 121*h*, through which they are readily transported due to the head of water 117 determined by weir edge 282; if necessary or desirable, means may be provided for removing solids from the water disposed through discharge conduit 121*h*, as by settling or the like. If desired, the water discharged from granulator 82*h* through conduit 121*h* may be recycled for reuse in granulator 82*h*, in a manner which will be apparent to those skilled in the art in the light of the disclosure herein.

Factors which are relevant to the construction and mode of operation of this new improved steel slag granulating and handling system and apparatus are discussed in my parent application S.N. 126,792, and that discussion is applicable to the system herein disclosed.

It will be apparent from the foregoing that the present invention provides a new improved slag handling system and apparatus which achieves the objects and advantages discussed earlier in this application.

The invention may be embodied in other specific forms wtihout departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for handling slag from an open hearth furnace having at least one charging door and located in a furnace building including a charging floor and kitchen below the charging floor on one side of the furnace, said apparatus comprising: granulator means in said kitchen including means for subjecting molten slag transferred from the furnace to a cooling medium in sufficient quantity to granulate the molten slag into relatively small pieces of ferrous and non-ferrous materials; an opening in said charging floor below said charging door through which front flushed slag may pass; a movable slag runner having a first portion movably mounted for feeding slag to said granulator means and a second portion disposable below said opening in the charging floor for receiving slag front flushed from said furnace through said opening; means for laterally moving said second portion of the slag runner to dispose said second runner portion below said charging floor opening so that slag front flushed from the furnace therethrough is transferred to said granulator means, said means also serving to displace said slag runner a sufficient distance from below said charging floor opening so that slag which is flushed therethrough is not conveyed to said granulator means.

2. An apparatus for handling slag from an open hearth furnace as defined in claim 1, wherein said means for laterally moving said slag runner includes means for supporting an upper portion of the slag runner above and spaced from the slag runner portion supported at the granulator means plus means for laterally moving this supporting means.

3. An apparatus for handling slag from an open hearth furnace as defined in claim 2, wherein said last-recited means includes slag runner support means movably mounted on guide means extending laterally of the slag runner and granulator means, whereby the slag runner is disposed in desired position by moving said runner support means on said guide means laterally of the granulator means.

4. An apparatus for handling slag from an open hearth furnace as defined in claim 2, wherein said upper slag runner support means is mounted on a trolley which is movably mounted on at least one rail extending laterally of the slag runner and granulator means, whereby said slag runner may be disposed in desired position by moving the trolley on said rail laterally of the granulator means.

5. An apparatus for handling slag from an open hearth furnace as defined in claim 4, wherein said means for laterally moving the upper slag runner support means comprises fluid cylinder and piston means operatively associated with said trolley for laterally moving the trolley on said rail to dispose the slag runner in desired position.

6. An apparatus for handling slag from an open hearth furnace as defined in claim 5, wherein said fluid cylinder and piston means is normally biased to position said second portion of the slag runner away from said charging floor opening so that slag front flushed from the furnace is not conveyed to said granulator means.

7. An apparatus for handling slag from an open hearth furnace as defined in claim 6, further including fluid control valve means biased so that fluid under pressure normally operates said cylinder and piston means to dispose said second portion of the slag runner away from below said charging floor opening, said control valve means being interlocked with at least one of the means for supplying cooling medium to the granulator means and the conveyor means included in said granulator means, whereby the control valve will not operate to dispose said second portion of the slag runner under the charging floor opening if one of said other interlocked means is not operating properly.

8. An apparatus for handling slag from an open hearth furnace as defined in claim 1, wherein: said first portion of the slag runner is pivotally mounted on a portion of said granulator means; and said means for laterally moving the slag runner includes an upper slag runner supporting means mounted on a trolley which is movably mounted on at least one arcuate rail extending laterally of the slag runner and granulator means, whereby the slag runner may be disposed in desired position with respect to the charging floor opening by moving the trolley on said arcuate rail.

9. An apparatus for handling slag from an open hearth furnace as defined in claim 1, wherein said means for laterally moving said slag runner includes hook means for removably engaging an upper portion of the slag runner above the granulator means, said hook means being movably mounted on guide means extending laterally of the slag runner and granulator means, whereby said slag runner may be disposed in desired position with respect to said charging floor opening by displacement of said movably mounted hook means on said guide means.

10. A slag handling apparatus for open hearth furnaces as defined in claim 1, said furnace having a slag grade below it sloping from said kitchen side downwardly to the pit side of the furnace, with a portion of said slag grade extending below said opening in the charging floor, so that when said second portion of said slag runner is removed from below said charging floor opening the front flushed slag is discharged to said slag grade and flows towards the pit side of the furnace.

11. An apparatus for handling open hearth furnace slag as defined in claim 1, further comprising hoist means in said kitchen below the charging floor and movable along the length of the granulator means for moving the slag runner and other items away from the region of the furnace.

12. An apparatus for handling slag from an open hearth furnace as defined in claim 1, wherein: said first portion of the slag runner is pivotally mounted on a portion of said granulator means; said means for laterally moving the slag runner includes means for supporting an upper portion of the slag runner above and spaced from the granulator means; said upper slag runner supporting means is mounted on a trolley means movably mounted on at least one arcuate rail supported on the furnace building and extending laterally of the slag runner and granulator means; and said means for laterally moving the slag runner includes fluid cylinder and piston means pivotally connected to said trolley means and part of the furnace building, whereby said slag runner may be disposed in desired position by movement of said trolley means upon operation of said cylinder and piston means.

13. An apparatus for handling slag from an open hearth furnace as defined in claim 9, said slag runner further comprising baffle means located between said hook means and said second slag runner portion disposed below said charging floor opening.

14. An apparatus for handling slag from a furnace, said apparatus comprising: granulator means including a tank with means for subjecting molten slag transferred from the furnace to a cooling medium in sufficient quantity to granulate the molten slag into relatively small pieces of ferrous and non-ferrous materials in the tank; a slag runner having a first portion pivotally mounted on part of said granulator tank and a second portion disposable at a location for receiving the molten slag to transfer the slag to said granulator means; and means for laterally moving said slag runner about said pivotally mounted first portion to dispose said runner for feeding slag to said granulator means, said moving means also serving to displace said slag runner about said pivotally mounted first portion so that molten slag is not conveyed to said granulator means by said slag runner.

15. An apparatus for handling slag from a steel-making furnace as defined in claim 14 and located in a furnace building wherein: said means for laterally moving the slag runner includes means for supporting an upper portion of the slag runner above and spaced from the granulator means; said upper slag runner supporting means is mounted on a trolley means movably mounted on at least one arcuate rail supported by part of the furnace building and extending laterally of the slag runner and tank of the granulator means; and said means for laterally moving the slag runner includes fluid cylinder and piston means connected to said trolley means and part of the furnace building, whereby said slag runner may be disposed in desired position by movement of said trolley means upon operation of said cylinder and piston means.

16. An apparatus for handling slag from a steel-making furnace as defined in claim 15, wherein said fluid cylinder and piston means is normally biased to position said second portion of the slag runner so that molten slag from the furnace is not conveyed to said granulator means.

17. An apparatus for granulating slag as defined in claim 14, further comprising: an opening in one side of said tank of the granulator means to permit egress of cooling medium from the tank; and an overflow and drain unit at least partially surrounding said opening, said unit including a first bottom sloping wall portion extending from said side of the granulator tank and a second concave portion secured thereto to form a weir edge therewith, with a discharge conduit means extending from said overflow and drain unit in communication with said concave portion thereof.

18. An apparatus for handling slag from an open hearth furnace having at least one charging door and located in a furnace building including a charging floor and kitchen below the charging floor on one side of the furnace, said apparatus comprising: granulator means in said kitchen including means for subjecting molten slag transferred from the furnace to a cooling medium in sufficient quantity to granulate the molten slag into relatively small pieces of ferrous and non-ferrous materials; an opening in said charging floor below said charging door through which front flushed slag may pass; a movable slag runner having a first portion movably mounted for feeding slag to said granulator means and a second portion disposable below said opening in the charging floor for receiving slag front flushed from said furnace through said opening; means for laterally moving said second portion of the slag runner to dispose said second runner portion below said charging floor opening so that slag front flushed from the furnace therethrough is transferred to said granulator means, said means also serving to displace said slag runner a sufficient distance from below said charging floor opening so that slag which is flushed therethrough is not conveyed to said granulator means; said means for laterally moving said slag runner including means for supporting an upper portion of the slag runner above and spaced from said first slag runner portion supported adjacent the granulator means plus means for laterally moving this supporting means; said means for laterally moving the upper slag runner support means comprising fluid cylinder and piston means operatively associated with said trolley for laterally moving the trolley on said rail to dispose the slag runner in desired position; said fluid cylinder and piston means being normally biased to position said second portion of the slag runner away from said charging floor opening so that slag front flushed from the furnace is not conveyed to said granulator means; and fluid control valve means for operating said cylinder and piston means, with said control valve means being interlocked with at least one of the means for supplying cooling medium to the granulator means and conveyor means incorporated in said granulator means, whereby the control valve will not operate to dispose said second portion of the slag runner under the charging floor opening if one of said other interlocked means is not operating properly.

19. An apparatus for handling molten steel slag from a furnace, said apparatus comprising: granulator means including a tank with means for subjecting molten steel slag transferred from the furnace to a cooling medium in sufficient quantity to granulate the molten slag into relatively small pieces of ferrous and non-ferrous materials in the tank; a slag runner having a first portion movably mounted with respect to part of said granulator tank and a second portion disposable at a location for receiving the molten slag to transfer the slag to said granulator means; and means for moving said slag runner about said movably mounted first portion to dispose said runner for feeding slag to said granulator means, said moving means also serving to displace said slag runner about said movably mounted first portion so that molten slag is not conveyed to said granulator means by said slag runner; said means for moving the slag runner including power operated means for disposing the slag runner in desired position, said power operated means normally positioning said slag runner so that molten slag is not conveyed to said granulator means unless said power operated means is activated to dispose the slag runner so as to convey molten slag to the granulator means.

No references cited.

JOHN F. CAMPBELL, *Primary Examiner.*

M. L. FAIGUS, *Assistant Examiner.*